United States Patent [19]

Matsuo et al.

[11] Patent Number: 5,099,314
[45] Date of Patent: Mar. 24, 1992

[54] LUMINANCE SIGNAL/COLOR SIGNAL SEPARATION CIRCUIT

[75] Inventors: Yasutoshi Matsuo, Kawasaki; Hiroshi Yamada, Yokohama, both of Japan

[73] Assignee: Victor Company of Japan, Ltd., Yokohama, Japan

[21] Appl. No.: 241,746

[22] Filed: Sep. 8, 1988

Related U.S. Application Data

[63] Continuation-in-part of Ser. No. 201,926, Jun. 3, 1988, Pat. No. 4,916,527.

[30] Foreign Application Priority Data

Sep. 11, 1987 [JP] Japan .................. 62-228737
Oct. 21, 1987 [JP] Japan .................. 62-265885
Oct. 21, 1987 [JP] Japan .................. 62-265886

[51] Int. Cl.$^5$ .................. H04N 9/535
[52] U.S. Cl. .................. 358/31
[58] Field of Search .................. 358/31

[56] References Cited

FOREIGN PATENT DOCUMENTS 0075991 5/1983 Japan .................. 358/31

*Primary Examiner*—James J. Groody
*Assistant Examiner*—David E. Harvey
*Attorney, Agent, or Firm*—Fleit, Jacobson, Cohn, Price, Holman & Stern

[57] ABSTRACT

A luminance signal/color signal separation circuit comprises a bandpass filter which separates a first color signal partially including a luminance signal component from a composite image signal, a delay circuit which delays the first color signal to obtain a second color signal, a logic circuit which outputs a luminance component signal from the first color signal and the second color signal, a first adder/subtracter which extracts a third color signal free from the luminance signal component by combining the luminance component signal and the first color signal, and a second adder/subtracter which extracts luminance signal by combining the third color signal and the composite image signal. Another luminance signal/color signal separation circuit comprises a wide range bandpass filter which separates a first color signal from a composite image signal, a delay circuit which delays the first color signal to obtain a second color signal, a logic circuit which outputs color signal with a wide range or with a reduced level is response to the degree of vertical correlation of pictures, and an adder/subtracter which outputs a luminance signal. Color signal with a narrow range can be outputted in place of the signal with the reduced level.

7 Claims, 7 Drawing Sheets

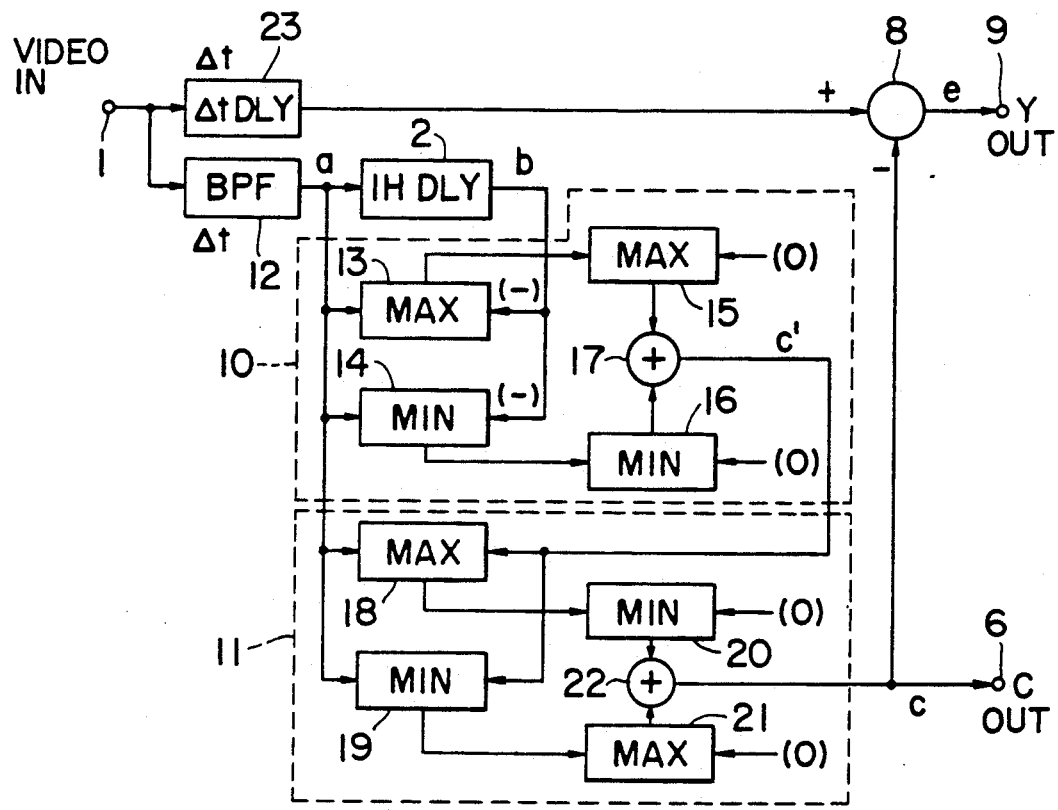
FIG. 1
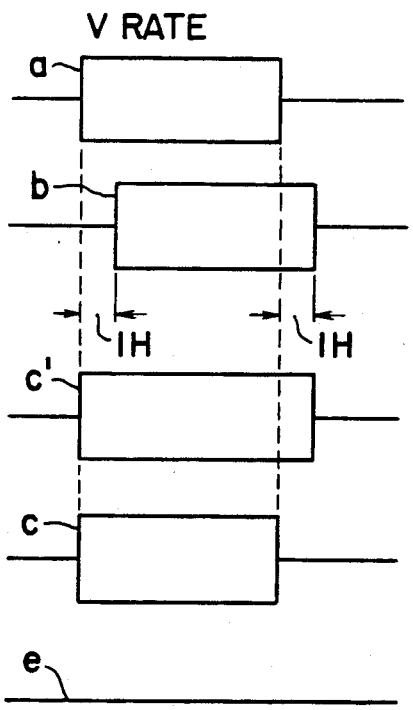
FIG. 2A
FIG. 2B
FIG. 2C
FIG. 2D
FIG. 2E

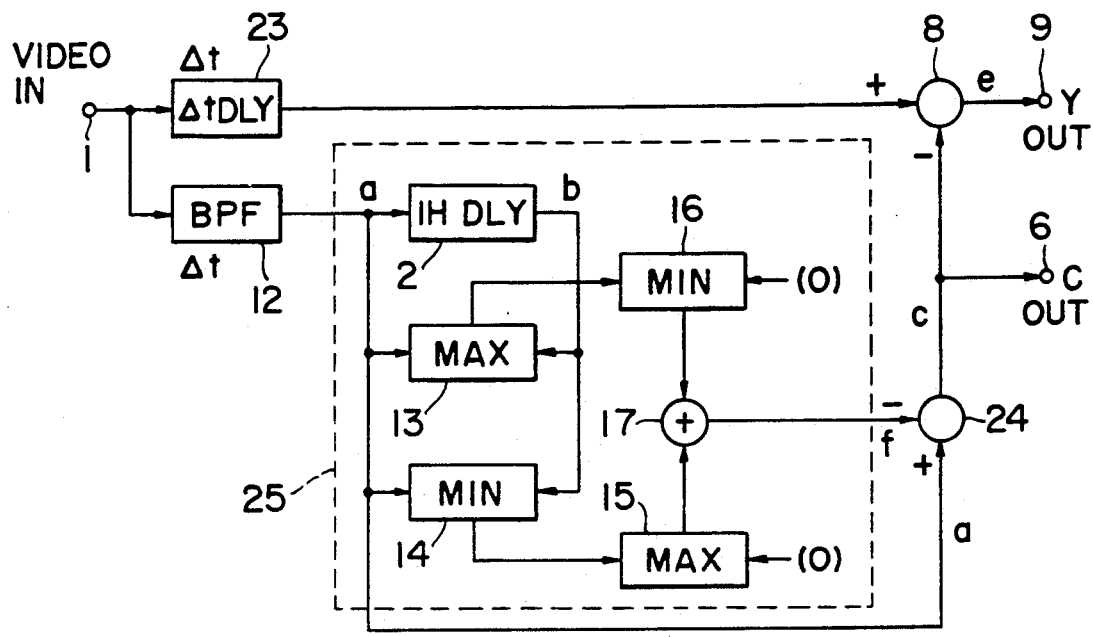
FIG. 3
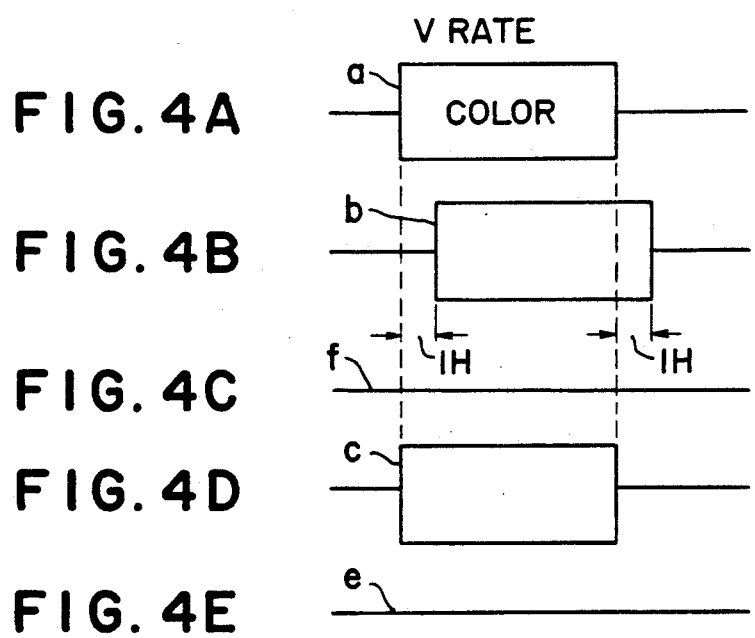
FIG. 4A
FIG. 4B
FIG. 4C
FIG. 4D
FIG. 4E

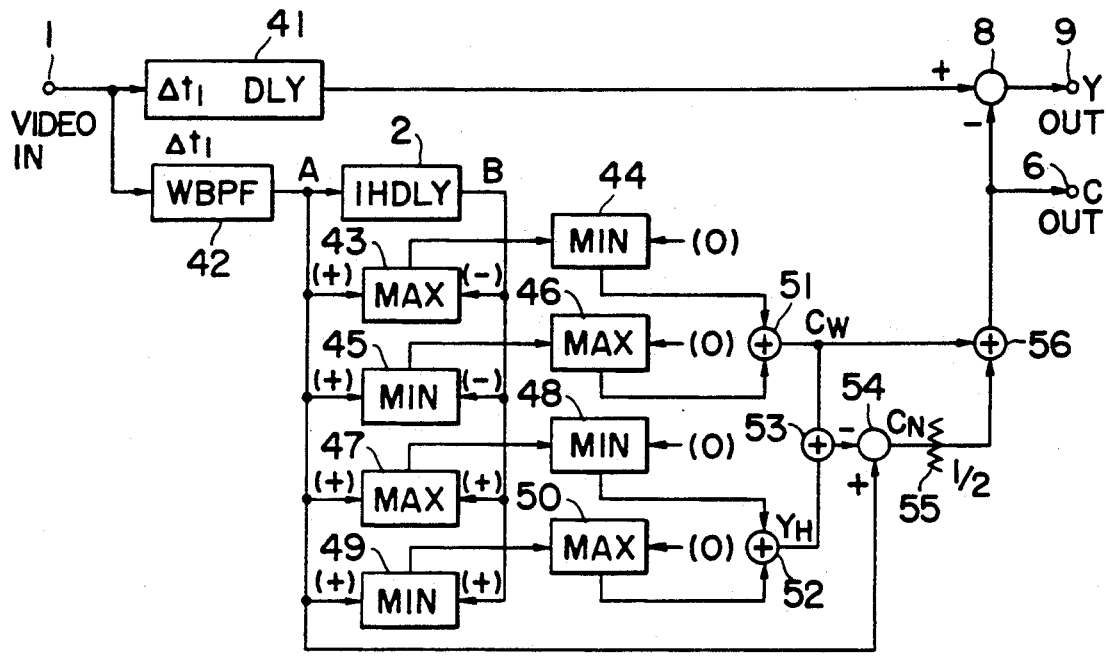
F I G. 10
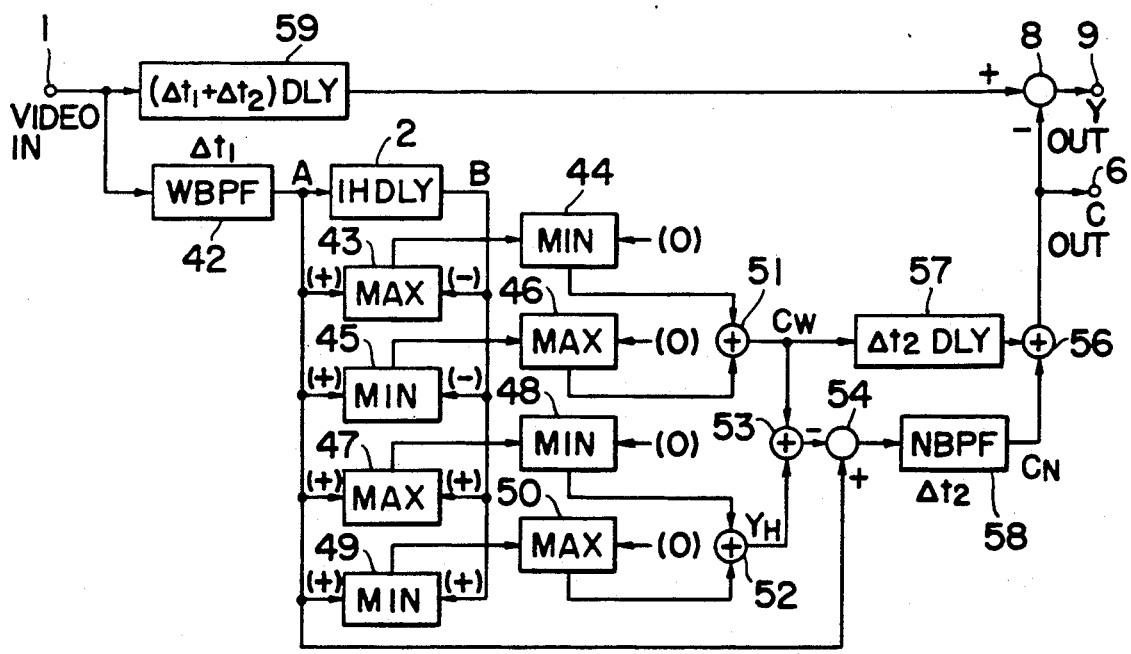
F I G. 11

LUMINANCE SIGNAL/COLOR SIGNAL SEPARATION CIRCUIT

The instant application is a continuation-in-part application of U.S. Ser. No. 07/201,926 filed June 3, 1988, now U.S. Pat. No. 4,916,527.

BACKGROUND OF THE INVENTION

This invention relates to a luminance signal/color signal separation circuit, and more particularly to a circuit for separating Y (luminance) signals and C (carrier chrominance) signals from a composite image signal, to extract them, e.g., in VTR, etc.

In a conventional Y/C separation circuit, a composite image signal (color bar signal) incoming to the input terminal is changed to a 1H delayed signal by a 1H delay circuit. The 1H delayed signal is subtracted from the composite image signal by a subtracter. The signal thus obtained further goes through a bandpass filter and a ½ amplifier and is then outputted from the C output terminal as a C signal. On the other hand, the composite image signal is delayed by Δt corresponding to the delay time of the bandpass filter at a Δt delay circuit. The C signal is subtracted from the Δt delayed composite image signal at a subtracter and is then outputted from the Y output terminal as a Y signal.

However, such an image signal processing circuit has the problems that a thin color portion called a half-tone portion occurs in the C signal, whereby the color at the vertical transition portion of a pictorial image is thinned or color fringe is shifted downward in the displayed picture, and that dot crawl due to C signal crosstalk occurs in the Y signal, resulting in considerably degraded picture quality. A further problem with the image signal processing circuit is that vertical resolution lowers in the reproduction of fine character, etc. and thus shading in which color is changed to gray is produced, lacking clearness.

The truth table of the comb filter in the conventional circuit is shown in Table 1. In this Table, asterisk indicates the half tone or the color shift of C signal (dot crawl in the case of Y signal), and double asterisk indicates that a signal is considered as C signal as a whole.

TABLE 1

| a | b | c |
|---|---|---|
| 0 | 0 | 0 |
| 1 | 0 | ½* |
| 0 | 1 | −½* |
| 1 | 1 | 0 |
| 1 | −1 | 1** |
| −1 | 1 | −1** |

Accordingly, the Applicant has presented a circuit by Japanese Patent Application No. 140921/1987 as shown in FIG. 1. The luminance signal/color signal separation circuit comprises a color signal separation circuit for separating a composite image signal to obtain a first color signal partially including a luminance signal component, a first logic circuit for obtaining a second color signal including a color separation error signal by eliminating the luminance signal component from the first color signal, a second logic circuit for extracting a signal of the second highest potential from the first color signal, the second color signal, and a reference potential to obtain a third color signal excluding the color separation error signal, and a luminance signal separation circuit for obtaining a luminance signal from the composite signal and the third color signal.

In FIG. 1, a first logic circuit 10 is inputted with a C signal a partially including Y signal component and a signal b being delayed by 1H to output a color separation error signal c' as described later. A second logic circuit 11 is inputted with the C signal a partially including Y signal component and the output signal c' from the first logic circuit 10 to output a C signal c from which the Y signal component is reduced.

A composite image signal inputted to the terminal 1 is changed to a C signal a (partially including Y signal component) (FIG. 2A) at a bandpass filter 12. The C signal a is delivered to a high potential detection circuit (which will be referred to as "MAX" hereinafter) 13 and a low potential detection circuit (which will be referred to as "MIN" hereinafter) 14 of the first logic circuit 10, and, is subjected to 1H delay at a 1H delay circuit 2, resulting in a signal b (FIG. 2B). The signal b is delivered to the MAX 13 and the MIN 14 but a polarity of which is inverted by an inverter (not shown).

The output of the MAX 13 is delivered to a MAX 15, at which it is compared with 0V. On the other hand, the output of the MIN 14 is delivered to a MIN 16, at which it is compared with 0V. The MAX 15 is constituted wherein when the output of the MAX 13 is above 0V, the output of MAX 13 becomes the output. Further, the MIN 16 is constituted wherein when the output of the MIN 14 is below 0V, the output of MIN 14 becomes the output.

The output of the MAX 15 and the output of the MIN 16 are added at an adder 17, resulting in a signal c' (FIG. 2C). The relationship in respect of the outputs of the MAX 15 and the MIN 16, and the signal c' is shown in Table 2. It is to be noted that the combinations indicated by asterisks in this table do not occur actually.

TABLE 2

| MAX 15 | MIN 16 | c' |
|---|---|---|
| 0 | 0 | 0 |
| 1 | 0 | 1 |
| 0 | −1 | −1 |
| 1 | −1 | 0 |
| *1 | 1 | |
| *−1 | −1 | |

The truth table of the first logic circuit 10 is shown in Table 3. As apparent from this Table, in the case that signals a and b have the same level, an input signal is considered as the Y signal to output 0, while in the case of asterisk except for that in Table 2, all input signals are considered as C signals (C signals including color separation error signals).

TABLE 3

| a | b | c' |
|---|---|---|
| 0 | 0 | 0 |
| 1 | 0 | 1* |
| 0 | 1 | −1* |
| 1 | 1 | 0 |
| 1 | −1 | 1* |
| −1 | 1 | −1* |

The signal c' and the signal a are delivered to a MAX 18 which has the same configuration as that of the MAX 13 and performs the same operation as that of the MAX 13, and, on the other hand, are delivered to a MIN 19 which has the same configuration as that of the MIN 14 and performs the same operation as that of the MIN 14. The output of the MAX 18 is delivered to a MIN 20 which has the same configuration as that of the MIN 16 and performs the same operation as that of the MIN 16, at which it is compared with 0V. On the other hand, the output of MIN 19 is delivered to a MAX 21 which has the same configuration as that of the MAX 15 and performs the same operation as that of the MAX 15. Thus, the output of the MIN 20 and the output of the MAX 21 are added at an adder 22, from which the output thus added is taken out in a terminal C as a correct C signal c (FIG. 2D). By subtracting the C signal c from the output signal of a $\Delta t$ delay circuit 23 having a delay equal to the delay of the BPF 12 at a subtracter 8, a Y signal e (FIG. 2E) is outputted to a terminal 9.

Data which appear to be C signals, and which are indicated by asterisk in Table 3 are all considered provisionally as C signal at the first logic circuit 10. The second logic circuit 11 carries out error correction of such data.

It is generally known that where the C signal is obtained with a comb filter, if this C signal is completely correct, then both the level and the phase thereof are in correspondence with those of the current line signal a, while if not correct, they are not both in correspondence with them (signals to which asterisk is attached). The second logic circuit 11 obtains a correct C signal by making use of the characteristic mentioned above.

Namely, where the current line signal a and the signal c' are in phase with each other, when $a \geq c'$, the signal c becomes the signal c', while when $a < c$, the signal c' becomes the signal a. On the other hand, where the current line signal a and the signal c' are opposite in phase, signals c are all 0. In this instance, "inphase" implies that at least signal c' is considered as signal C, and that "opposite phase" implies that it is considered as a Y signal in the comb filter of the two line system having been described as the prior art. Thus, it cannot be said that the signal c' is a completely correct C signal when it is above the signal a in spite of being in-phase. In such a case, the second logic circuit 11 outputs the signal C with it having an amplitude suppressed to that of the signal a, thus to correct an error produced at the first logic circuit 10.

The truth table indicating the operation of the second logic circuit 11 described above is shown in Table 4, and C signal and Y signal extracted via the first and second logic circuits 10 and 11 are shown in Table 5. Namely, the second logic circuit 11 outputs the second highest potential of the signals a and c' and the reference potential. In Table 5, half tone of C signal or dot crawl of Y signal as in the conventional example (asterisk in Table 1) does not occur at the portion indicated by asterisk, and color blurring at a boundary between subsequent lines having different colors to each others or dot crawl of the Y signal as in the prior art does not occur at the portion indicated by double asterisk.

TABLE 4

| a | c' | c |
|---|----|---|
| 0 | 0  | 0 |
| 1 | 0  | 0 |
| 0 | 1  | 0 |
| 1 | 1  | 1 |
| 1 | −1 | 0 |
| −1| 1  | 0 |

TABLE 5

| a | b | c | y |
|---|---|---|---|
| 0 | 0 | 0 | 0 |
| 1 | 0 | 1 | 0* |
| 0 | 1 | 0 | 0** |
| 1 | 1 | 0 | 1 |
| 1 | −1| 1 | 0 |
| −1| 1 | −1| 0 |

Accordingly, high quality pictorial image free from color shift and/or dot crawl which have been encountered with the prior art can be obtained. In addition, since 0 is output as signal c if not data exists in the current line signal a, there is no degradation of the vertical resolution in the case of reproducing fine characters, thus making it possible to obtain a distinct pictorial image.

However, the circuit shown in FIG. 1 previously proposed by the applicant has a large circuit construction and cost reductions are difficult to achieve.

Moreover, the circuit shown in FIG. 1 has a problem as described below.

In case of pictures having no vertical correlation, the C output signals and Y output signals become similar to signals passed through a bandpass filter and a band limited filter, respectively. In these cases, the band widths for C signal and Y signal are determined by the band width of the bandpass filter 12. In contrast, in the case of pictures having vertical correlation, the C output signals and Y output signals become signals which are obtained by passing through a comb filter, and both the band widths are determined by the band width of the bandpass filter 12. Thus, whether the pictures have vertical correlations or not, the band widths of C signal and Y signal which are to be separated are dependent on the band width of the bandpass filter 12.

In order to solve this problem, if the band width for obtaining the C signal of the bandpass filter is made wide, for pictures such as color bar signal, having vertical correlation, cross-luminance which is a phenomenon generating dots at the color borderlines of color bars will not occur, and the frequency characteristics will be improved. However, for random image pictures having no vertical correlation, such as outdoor scenery, there may occur a problem of shading. In contrast, if the band width of the bandpass filter is designed to be relatively narrow, for the above-mentioned picture having no vertical correlation, shading will not occur, but for the above-mentioned picture having vertical correlation, cross-luminance will occur and the frequency characteristics will be deteriorated.

Accordingly, the object of the invention is to provide a luminance signal/color signal separation circuit having a good separation quality with a simplified construction.

According to one aspect of the invention, there is provided a luminance signal/color signal separation circuit comprising: bandpass filtering means for separating a first color signal partially including a luminance signal component from a composite image signal; first delay means for outputting a delayed first color signal as a second color signal by a time period which is multiple of integer of a horizontal scanning period; logic means for outputting a luminance component signal from the first color signal and the second color signal; first separating means for separating a third color signal which is free from the luminance signal component by adding/subtracting the luminance component signal to/from the first color signal; and second separating means for separating luminance signal by adding/subtracting the third color signal to/from the composite image signal.

According to another aspect of the invention, there is provided a luminance signal/color signal separation circuit comprising: wide range bandpass filtering means for separating a first color signal from a composite image signal; delay means for outputting a delayed color signal as a second color signal by a time period which is multiple of integer of a horizontal scanning period; logic means for outputting the color signal with the wide range for pictures having vertical correlation and with a reduced level for pictures having no vertical correlation; and separating means for separating luminance signal by adding/subtracting the color signal to/from the composite image signal.

Other objects and features of this invention will be described with reference to the attached drawings.

BRIEF DESCRIPTION OF THE DRAWINGS

In the accompanying drawings:

FIG. 1 is a block diagram of a circuit proposed by the Applicant;

FIGS. 2A-2E are views showing the signal waveforms of FIG. 1;

FIG. 3 is a block diagram of a first embodiment of a circuit according to this invention;

FIGS. 4A-4E are views showing the signal waveforms of FIG. 3;

FIG. 10 is a block diagram showing a fifth embodiment of a circuit according to this invention;

FIG. 11 is a block diagram showing sixth embodiment of a circuit according to this invention;

DESCRIPTION OF THE PREFERRED EMBODIMENT

Figure 5A:
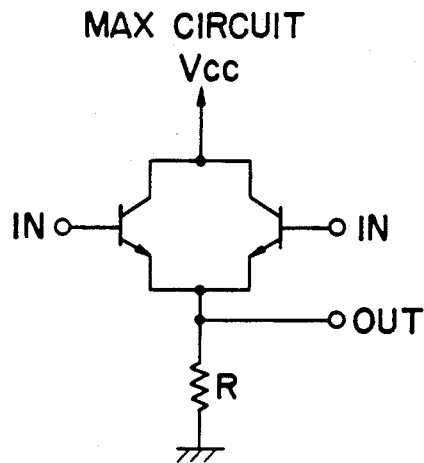
FIGS. 5A and 5B are actual circuit diagrams of MAX and MIN of FIG. 1.

FIG. 3 is a block diagram showing a first embodiment of a circuit according to this invention. Like reference numerals are attached to the same components as those in FIG. 1 and in this figure, respectively. This circuit comprises a bandpass filter 12 which is a circuit for obtaining color signal a which includes a part of luminance component (i.e. separation error signal) from a composite image signal, a logic circuit 25, enclosed by a broken line, which is a circuit for extracting the luminance component f from the color signal a which includes the separation error signal and a subtracter 24 which subtracts the luminance component f from the color signal a which includes the separation error signal to extract a color signal c free from the separation error signal.

The logic circuit 25 has a 1H delay circuit 2, MAX circuits 13 and 15, MIN circuits 14 and 16, and an adder circuit 17. Being different from the construction of FIG. 1, the output of the MAX 13 is delivered to the MIN 16 and the output of the MIN 14 is delivered to the MAX 15, respectively.

Figure 5B:
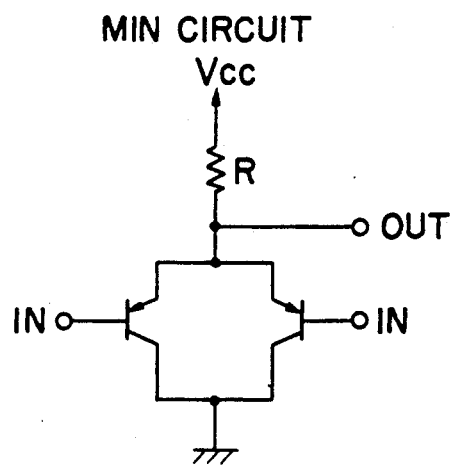

A composite image signal incoming to the terminal 1 is changed to a C signal a (including Y signal component) (FIG. 4A) at a bandpass filter 12. The C signal a is delivered to a MAX 13 and a MIN 14 of the logic circuit 25, and, on the other hand, is subjected to 1H delay at a 1H delay circuit 2, resulting in a signal b (FIG. 4B). In this embodiment, the MAX 13 is composed of a pair of npn transistors and a load resistor R connected in series between Vcc and ground as shown in FIG. 5A to output a higher potential of either the signal a or the signal $-b$. In addition, the MIN 14 is composed of a load resistor R and a pair of pnp transistors connected in series between Vcc and ground as shown in FIG. 5B to output a lower potential of either the signal a or the signal $-b$.

The output of the MAX 13 is delivered to a MIN 16, at which it is compared with 0V. On the other hand, the output of the MIN 14 is delivered to a MAX 15, at which it is compared with 0V. The MAX 15 is constituted wherein when the output of the MIN 14 is above 0V, this output is passed as the output from the MAX 15. Further, the MIN 16 is constituted wherein when the output of the MAX 13 is below 0V, this output is passed as the output from the MIN 16.

The output of the MAX 15 and the output of the MIN 16 are added at an adder 17, resulting in a signal f (FIG. 4C). The relationship in respect of signal a, signal b and the signal f is shown in Table 6.

TABLE 6

| a | b | f | (c) $C_{OUT}$ | (e) $Y_{OUT}$ |
|---|---|---|---|---|
| 0 | 0 | 0 | 0 | 0 |
| 0 | 1 | 0 | 0 | 0* |
| 1 | 0 | 0 | 1 | 0* |
| 1 | 1 | 1 | 0 | 1 |
| 1 | $-1$ | 0 | 1 | 0 |
| $-1$ | 1 | 0 | $-1$ | 0 |

As apparent from this Table, in the case that signals a and b have the same level, and the same polarity, an input signal is considered as Y signal to output 1.

The signal f extracted in the logic circuit 25 is delivered to a subtractor 24. At the subtractor 24, the signal f is subtracted from the output signal a of the bandpass filter 12, from which the signal c (FIG. 4D) is outputted to a terminal 6. This signal c is a color signal free from separation error signal because the signal c is a resultant signal by subtracting Y signal f from the color signal a including the separation error signal (Y signal). On the other hand, the signal c is delivered to a subtracter 8 and subtracted from the composite image signal which is the output signal of the delay circuit 23 to obtain Y signal e (FIG. 4E).

A truth table indicating the operations of the logic circuit 25, subtracter 24 and 8 described above, is shown in Table 6. In summary, as clearly shown in Table 6, when the signal a is "1" and signal b is "0", and signal a is "1" and signal b is "$-1$", the C output signal becomes "1". When the signal a is "$-1$" and the signal b is "1", the C output signal becomes "$-1$". If both signals a and b are "1", the Y output signal becomes "1". Even at the row indicated by asterisk in the Table 6 (same portions as in FIG. 1), half tone or color fringe shift of the C signal and dot crawl will not occur.

Figure 6:
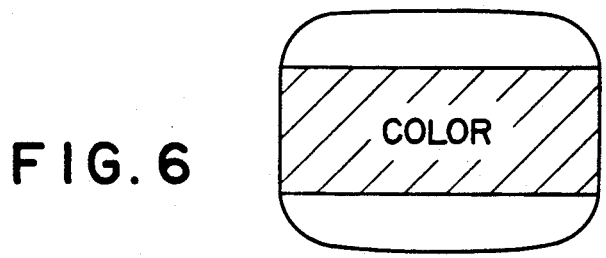
FIG. 6 shows a reproduced image of a color bar signal obtained by the circuit shown in FIG. 3.

Accordingly, as shown in FIG. 6, an image of high quality without color shift and dot crawl can be obtained. Further, if there is no data on the present line signal a, the signal c is outputted as "0" and there is no deterioration of the vertical resolution while fine characters are reproduced resulting clear image.

Figure 7:
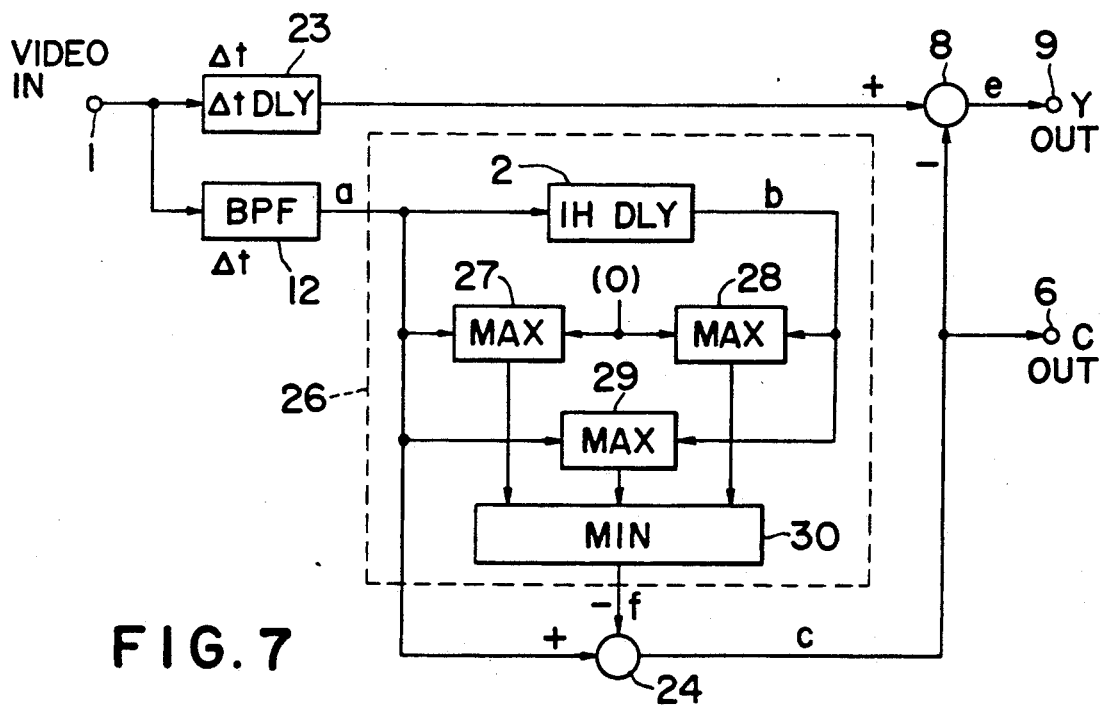
FIG. 7 is a block diagram showing a second embodiment of a circuit according to this invention.

FIG. 7 shows a second embodiment according to this invention. Like reference numerals are attached to the same components as those in FIG. 1, FIG. 3 and in this figure, respectively. In this embodiment, the logic circuit 25 in the FIG. 3 is replaced with a logic circuit 26 which has different circuit construction from that in FIG. 3.

The logic circuit 26 comprises a 1H delay circuit 2 which delays an output signal a of the bandpass filter 12, a MAX 27 which outputs higher potential between the signal a and 0V, a MAX 28 which outputs higher potential between 0V and the signal b, a MAX 29 which outputs higher potential between the signals a and b, and a MIN 30 which outputs the lowest potential among outputs of the MAX 27, MAX 28 and MAX 29. The output signal f of the MIN 30 is delivered to a subtracter 24 which subtracts the output of the MIN 30 from the signal a. An output signal c of the subtracter 24 is subsequently outputted from a terminal 6 as C output signal and delivered to a subtracter 8 which makes Y output signal e by subtracting signal c from the output signal of delay circuit 23.

The truth table of the circuit shown in FIG. 7 is also shown in Table 6.

It is to be noted that MAX circuits and MIN circuits in FIG. 6 and FIG. 7 are interchangeable to obtain the same result.

Figure 8:
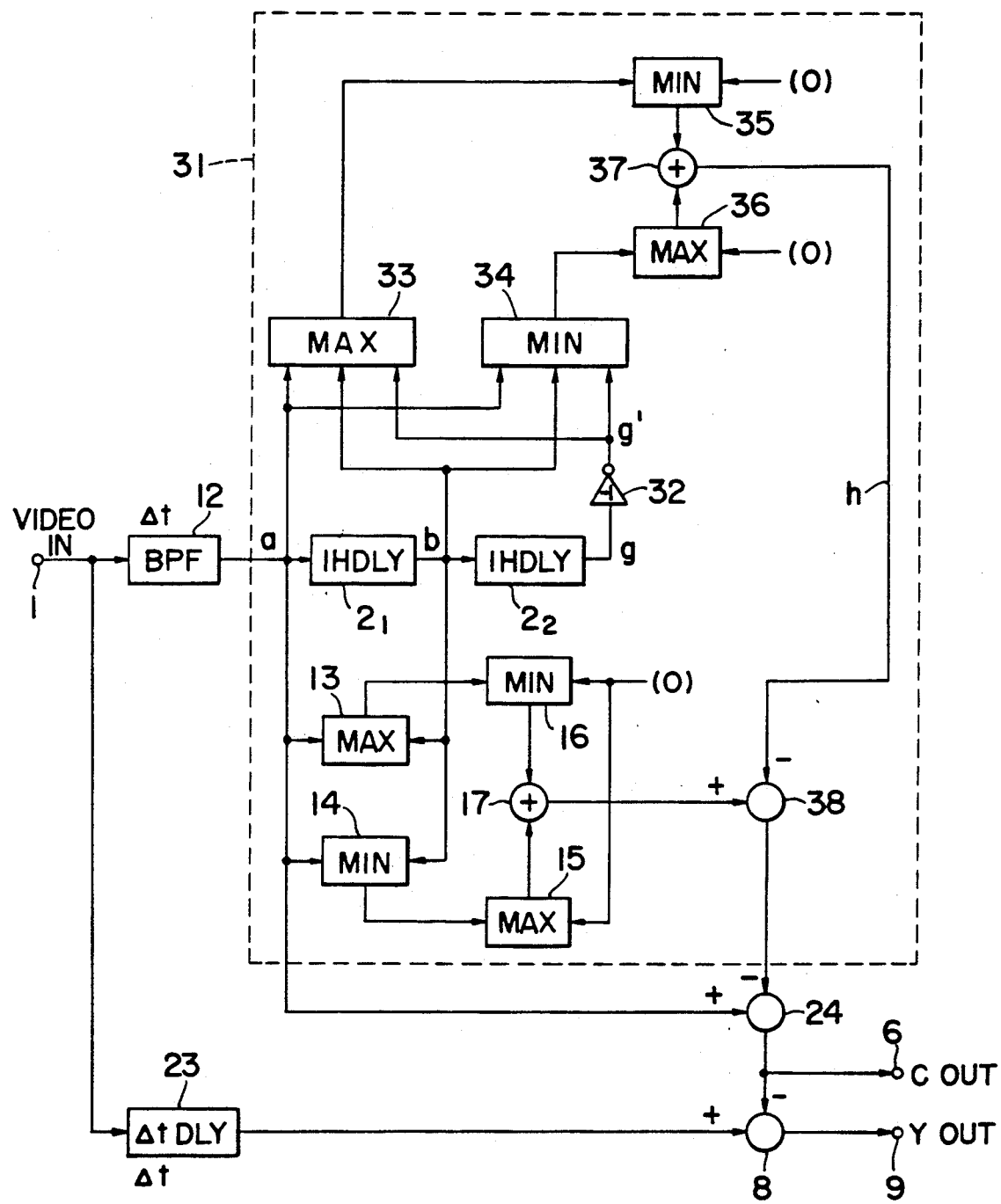
FIG. 8 is a block diagram showing a third embodiment of a circuit according to this invention.

FIG. 8 is a block diagram showing a third embodiment of a circuit according to this invention. In this figure, like reference numerals are attached to the same components as those in FIG. 3 and 7 and their explanation will be omitted. In this embodiment, there is employed a comb filter of three line system using two 1H delay circuits ($2_1$, $2_2$).

In addition to the construction of the logic circuit 25 in the FIG. 3, a logic circuit 31 has a MAX 33 and a MIN 34 which are inputted with signal a, signal b which is an output signal of the delay circuit $2_1$ and an inversed output g' of an inversion amplifier 32 which inverts the output g of the 1H delay circuit $2_2$, a MIN 35 which compares the output signal of the MAX 33 with 0V, a MAX 36 which compares the output of the MIN 34 with 0V, an adder circuit 37 which adds the output of the MIN 35 to the output of the MAX 36 and a subtracter 38 which subtracts the output of the adder 37 from the output of the adder 17.

Figure 9:
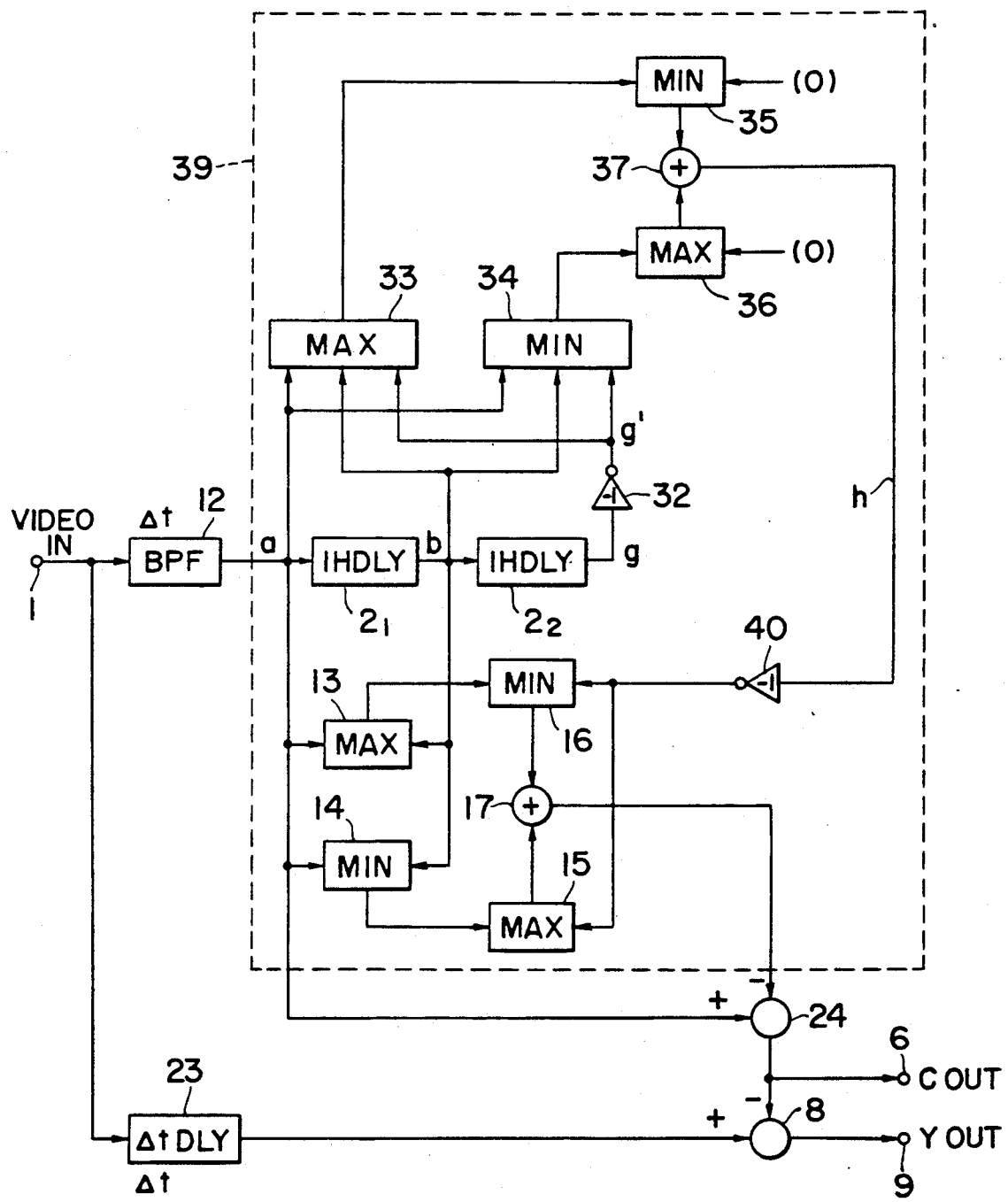
FIG. 9 is a block diagram showing a fourth embodiment of a circuit according to this invention.

FIG. 9 shows a fourth embodiment of a circuit according to the present invention. In this figure, a logic circuit 39 has a similar circuit construction and like reference numerals are attached to the same components as those in FIG. 8 and their explanation will be omitted.

The differences between the logic circuit 31 of FIG. 8 and corresponding logic circuit 39 of FIG. 9 are that the output signals of MAX 13 and MIN 14 are not compared to 0V at the MAX 15 and MIN 16 but compared to the inverted correction output signal h of the adder 37 inverted by the inverting amplifier 40 and that the logic circuit 39 does not have the subtracter 38.

The truth table for signals a, b, g and the correction output signal h of the adder 37 is shown in Table 7.

TABLE 7

| a | b | g | 1st and 2nd Embodiments (2 lines) $C_{OUT}$ | 3rd and 4th Embodiments (3 lines) $C_{OUT}$ | Correction output h |
|---|---|---|---|---|---|
| 0 | 0 | 0 | 0 | 0 | 0 |
| 0 | 0 | 1 | 0 | 0 | 0 |
| 0 | 1 | 0 | 0 | 0 | 0 |
| 0 | 1 | 1 | 0 | 0 | 0 |
| 0 | 1 | −1 | 0 | 0 | 0 |
| 1 | 0 | 0 | 1 | 1 | 0 |
| 1 | 0 | 1 | 1 | 1 | 0 |
| 1 | 0 | −1 | 1 | 1 | 0 |
| 1 | 1 | 0 | 0 | 0 | 0 |
| 1 | −1 | 0 | 1 | 1 | 0 |
| 1 | 1 | 1 | 0 | 0 | 0 |
| *1 | 1 | −1 | 0 | 1 | 1 |
| 1 | −1 | 1 | 1 | 1 | 0 |
| 1 | −1 | −1 | 1 | 1 | 0 |

In this table, the portion with the asterisk denotes a state in which two different hues have inverted hues to each other and are bounded at a line, e.g. green up and magenta down. According to the 1st and 2nd embodiments of this invention, the level of the C signal output $C_{OUT}$ becomes "0" (which is different level from that of present line) to generate dot crawl because of the two line system. However, according to the 3rd and 4th embodiments of the present invention, the level of the C output signal $C_{OUT}$ becomes "1" (which is the same level as that of the present line) because of the three line system, resulting free from dot crawl at hue inversed portion.

Moreover, in the 3rd and 4th embodiments of the present invention, it is not necessary to add a 1H delay circuit to the Y signal output side because the correct output can be obtained without delaying the signal of the present line.

FIG. 10 shows fifth embodiment of the present invention.

The inputted video signal is delivered to a delay circuit 41 having a delay time of $\Delta t_1$ and to the wide range bandpass filter WBPF 42 having a delay time of $\Delta t_1$. The output signal A of the WBPF 42 is delivered to a 1H delay circuit 2, MAX circuits 43 and 47, MIN circuits 45 and 49, and a subtracter 54. The output signal B of the 1H delay circuit 2 is delivered to the MAX circuit 47 and the MIN circuits 49. And inverted output signal −B (an inverter for this is not shown) of the 1H delay circuit is delivered to the MAX circuit 43 and the MIN circuit 45. An output of the MAX circuit 43 is delivered to a MIN circuit 44, at which it is compared with 0V, and the one with the lower level is extracted. And an output of the MIN circuit 45 is delivered to a MAX circuit 46, at which it is compared with 0V, and higher level of them is extracted. The output of the MIN 44 and the output of the MAX 46 are added at the adder 51 to form an output signal of a wide range color comb signal $C_W$.

Similarly, an output of the MAX circuit 47 is delivered to a MIN circuit 48, at which it is compared with 0V, and lower level of them is extracted. And an output of the MIN circuit 49 is delivered to a MAX circuit 50, at which it is compared with 0V, and higher level of them is extracted. The output of MIN 48 and the output of MAX 50 are added at the adder circuit 52 to form an output of luminance signal $Y_H$.

The $C_W$ signal and $Y_H$ signal are added at an adder 53 and the output of the adder 53 is subtracted from the signal A at a subtracter 54 to generate a signal $C_N$. The output of the subtracter 54 is delivered to an adder 56 through a ½ circuit 55. At the adder 56, the signal $C_N/2$ is added to the signal $C_W$ to generate C signal to be taken out from the terminal 6. On the other hand, by subtracting the C signal from the output of the delay circuit 41 at the subtracter 8, a Y signal is obtained to output from the terminal 9.

The truth table for signals A, B, $C_W$, $Y_H$, $C_W+Y_H$, $C_N$, $C_{OUT}$ and $Y_{OUT}$ of this embodiment are shown in Table 8, where, $C_N = A = -(C_W+Y_H)$, $C_{OUT} = C_W + C_N/2$.

TABLE 8

| A | B | (−B) | $C_W$ | $Y_H$ | $C_W + Y_H$ | $C_N$ | $C_{OUT}$ | $Y_{OUT}$ | |
|---|---|---|---|---|---|---|---|---|---|
| 0 | 0 | (0) | 0 | 0 | 0 | 0 | 0 | 0 | |
| 0 | 1 | (−1) | 0 | 0 | 0 | 0 | 0 | 0 | |
| 1 | 0 | (0) | 0 | 0 | 0 | 1 | ½ | ½ | *2 |
| 1 | 1 | (−1) | 0 | 1 | 1 | 0 | 0 | 1 | |
| 1 | −1 | (1) | 1 | 0 | 1 | 0 | 1(W) | 0 | *1 |

For the case (*1 in Table 8) where there are pictures having vertical correlation such as color bar signals, since the signal A is "1" and the signal B is "−1", the output signal $C_W$ of the adder 51, the output signal of the adder 52, the output signal of the adder 53, the output of the subtracter 54, and the signal $C_N$ become "1", "0", "1", "0" and "0", respectively. The signal $C_W$ of "1" is outputted from the terminal 6 as a wide range C signal (1(W)) through the adder 56. And the C signal of "1" is subtracted from the signal "1" of the output of the delay circuit 41 to obtain Y signal of "0", which is outputted from the terminal 9.

On the other hand, for the case (*2 in the Table 8) where pictures having no vertical correlation such as outdoor scenery, since the signal A is "1" and the signal B is "0", the output signal $C_W$ of the adder 51, the output signal of the adder 52, the output signal of the adder 53, and the output of the subtracter 54, become "0", "0", "0" and "1", respectively. The level of the output signal "1" of the subtracter 54 is made to ½ by the ½ circuit 55 and it is taken out as ½ C signal. Since the level of $C_W$ signal is "0", the ½ C signal is outputted from the adder 56 and it is extracted from the terminal 6. The ½ C signal is subtracted from the output signal "½" of the delay circuit 41, the output signal is extracted from the terminal 9 as ½ Y signal.

Thus, the bandpass filter for C signals is made to have a wide range in the case of pictures having vertical correlations to obtain a wide range C signal output. This results in the cross-luminance characteristics and frequency characteristics of the C signal being improved. On the other hand, in the case of pictures having no vertical correlation, since the signal $C_N$ outputted from the subtracter 54 is made to ½ level, frequency characteristics deterioration of color signal band of the Y signal is reduced to decrease shading in fine pictures when compared to the circuit as shown in FIG. 1. It is to be noted that in this case, the C signal output becomes ½ level. However, there arises no problem because according to the conventional comb filter, the level of C signal is made ½ by averaging.

In Table 8, the row with A=1 and B=1 denotes the case with vertical correlations, wherein C signal output is "0" and Y signal output is "1".

FIG. 11 shows sixth embodiment of the present invention, which is a variation of the embodiment shown in FIG. 10. Like reference numerals are attached to the same components as those FIG. 10.

The difference between the construction of FIG. 11 and that of FIG. 10 is that the delay circuit 59 has a longer delay time of $(\Delta t_1 + \Delta t_2)$, that the wide range comb signal $C_W$ is delivered to the adder 56 through a delay circuit 57 having a delay time of $\Delta t_2$, and that the output signal of the subtracter 54 is delivered to the adder 56 through a narrow range bandpass filter NBPF 58 having a delay time of $\Delta t_2$.

Since the operations for obtaining the $C_W$ signal and $Y_H$ signal are the same as described in the fifth embodiment, the explanation will be omitted.

The $C_W$ signal outputted from the adder 51 and the $Y_H$ signal outputted from the adder 52 are added at an adder 53 and the $C_W$ signal is also delivered to an adder 56 through a delay circuit 57 having a delay time of $\Delta t_2$. The output of the adder 53 is subtracted from the signal A at a subtracter 54. The output of the subtracter 54 is delivered to the narrow range bandpass filter NBPF 58 and its output signal $C_N$ of the NBPF 58 is delivered to the adder 56. The $C_N$ and delayed $C_W$ are added at the adder 56, and the output of the adder 56 is subsequently extracted as C output signal from the terminal 6. On the other hand, by subtracting the C signal from the output of the delay circuit 59 at the subtracter 8, a Y output signal is obtained to output from the terminal 9.

The truth table for this embodiment is shown in Table 9. In this table, it is to be noted that $C_N = A = -(C_W + Y_H)$ and $C_{OUT} = C_W + C_N$.

TABLE 9

| A | B | (−B) | $C_W$ | $Y_H$ | $C_W + Y_H$ | $C_N$ | $C_{OUT}$ | $Y_{OUT}$ | |
|---|---|---|---|---|---|---|---|---|---|
| 0 | 0 | (0) | 0 | 0 | 0 | 0 | 0 | 0 | |
| 0 | 1 | (−1) | 0 | 0 | 0 | 0 | 0 | 0 | |
| 1 | 0 | (0) | 0 | 0 | 0 | 1 | 1(N) | 0 | *2 |
| 1 | 1 | (−1) | 0 | 1 | 1 | 0 | 0 | 1 | |
| 1 | −1 | (1) | 1 | 0 | 1 | 0 | 1(W) | 0 | *1 |

For the case where there are pictures having vertical correlation such as color bar signal, the operation is the same as that shown in Table 8.

For the case (*2 in the Table 9) where pictures having no vertical correlation such as outside scenery, since the signal A is "1" and the signal B is "0", the output signal $C_W$ of the adder 51, the output signal $Y_H$ of the adder 52, the output signal of the adder 53, the output of the subtracter 54, become "0", "0", "0" and "1", respectively. Consequently, the narrow range bandpass filter 58 outputs a narrow range C signal of "1" (1(N)). Since the level of the $C_W$ signal is "0", the narrow range C signal outputted from the adder 56 is extracted from the terminal 6. The C signal is subtracted from the output signal "1" from the delay circuit 59 to obtain Y signal of "0" which is extracted from the terminal 9.

Thus, according to this embodiment, the bandpass filter for C signals is made to have a wide range in the case of pictures having vertical correlations to obtain a wide range C signal output. This results in that the cross-luminance characteristics and frequency characteristics of the C signal can be improved. On the other hand, in the case of pictures having no vertical correlations, the filter is made to have a narrow range to obtain a narrow range C signal output. Accordingly, frequency characteristic deterioration of the color signal band of the Y signal is reduced to decrease shading in fine pictures. In other words, an appropriate band pass characteristic can be obtained in response to presence or absence of vertical correlations.

In Table 9, the row with A=1 and B=1 denotes the case with vertical correlations, wherein C signal output is "0" and Y signal output is "1".

Figure 12:
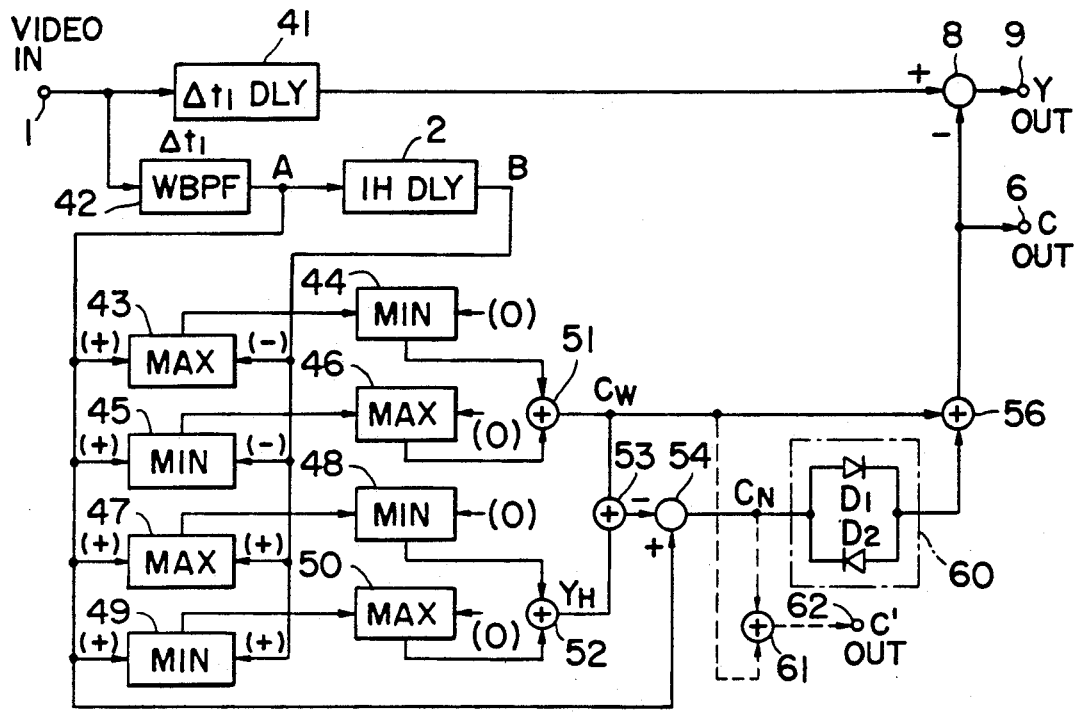
FIG. 12 is a block diagram showing a seventh embodiment of a circuit according to this invention.

FIG. 12 shows the seventh embodiment of the present invention. This embodiment is another variation of the embodiment shown in FIG. 10. Like reference numerals are attached to the same components as those in FIG. 10 and in this figure, respectively.

The circuit construction and the operation for obtaining $C_W$ and $C_N$ are the same as those in FIG. 10. In FIG. 12, a coring circuit 60 composed of two diodes connected in parallel with their polarities reversed is connected between the subtracter 54 and the adder 56. This coring circuit 60 passes signals having an amplitude larger than the threshold level of the diode and stops signals having an amplitude smaller than the threshold level.

The truth table for this embodiment is shown in Table 10.

TABLE 10

| A | B | (−B) | $C_W$ | $Y_H$ | $C_W + Y_H$ | $C_N$ | $C_{OUT}$ | $Y_{OUT}$ | |
|---|---|------|-------|-------|-------------|-------|-----------|-----------|---|
| 0 | 0 | (0)  | 0 | 0 | 0 | 0 | 0 | 0 | |
| 0 | 1 | (−1) | 0 | 0 | 0 | 0 | 0 | 0 | |
| 1 | 0 | (0)  | 0 | 0 | 0 | 1 | 1 | 0 | *3 |
| 1 | 1 | (−1) | 0 | 1 | 1 | 0 | 0 | 1 | |
| 1 | −1| (1)  | 1 | 0 | 1 | 0 | 1(W) | 0 | *1 |

According to this Table, for the case where C signals have no vertical correlation such as the case A=1, B=0 (*3 in Table 10) and the output signal $C_N$ (=1) of the subtractor 54 has especially small amplitude, this signal $C_N$ is blocked by the coring circuit 41. Consequently the $C_{OUT}$ and $Y_{OUT}$ become approximate 0 and 1, respectively, realizing prevention of the deterioration of vertical resolution and especially decrease of the cross color since the C signal becomes approximately 0.

The broken lines in FIG. 12 show that a construction where signals $C_N$ and $C_W$ are added by the adder circuit 61 and C' output signal of the adder circuit 61 is extracted from the terminal 62 may be utilized. This construction is useful to decrease the deterioration in the C signal band of the Y signal only for preventing Y signal shading. In this case, the output signal at the terminal 6 is not used as the C signal, and the output of the adder circuit 56 is used only to obtain the Y signal.

Figure 13:
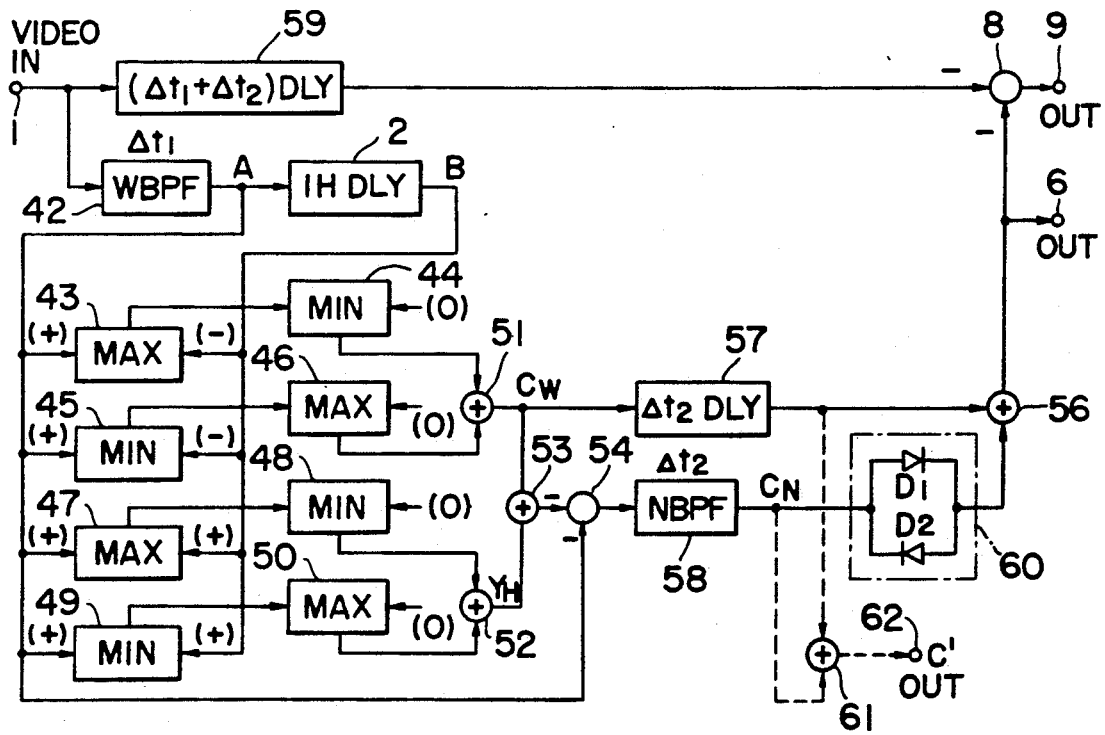
FIG. 13 is a block diagram showing an eighth embodiment of a circuit according to this invention.

FIG. 13 shows the eighth embodiment of the present invention. This embodiment is another variation of the embodiment shown in FIG. 11. Like reference numerals are attached to the same components as those in FIG. 11 and in this figure, respectively.

The circuit construction and the operation for obtaining $C_W$ and $C_N$ are the same as those in FIG. 11. In FIG. 13, a coring circuit 60 having the same construction is connected between the narrow range bandpass filter 58 and the adder circuit 56.

According to this circuit, for the case where C signals have no vertical correlation such as the case A=1, B=0 (*3 in Table 10) and the output signal $C_N$ (=1) of the narrow range bandpass filter 58 has especially small amplitude, this signal $C_N$ is blocked by the coring circuit 60. Consequently the $C_{OUT}$ and $Y_{OUT}$ become approximately 1 and 0, respectively, therefore preventing the deterioration of vertical resolution and the decrease of the cross color in particular, since the C signal becomes approximately 0.

The broken lines in FIG. 13 show that a construction where the outputs of the narrow range bandpass filter 58 and the delay circuit 57 are added by the adder circuit 61 and C' output signal of the adder circuit 61 is taken out from the terminal 62 may be utilized. This construction is useful to decrease the deterioration in the C signal band of the Y signal only for preventing Y signal shading. In this case, the output signal at the terminal 6 is not used as the C signal, and the output of the adder circuit 56 is used only to obtain the Y signal.

Although the above-mentioned embodiments are applicable to the NTSC system, they are also applicable to the PAL system by substituting 2H delay circuits for the 1H delay circuits 2, $2_1$, and $2_2$.

What is claimed is:

1. A luminance signal/color signal separation circuit comprising:
   bandpass filtering means for separation of a first color signal which comprises a color signal component and a luminance signal component from a composite image signal;
   delay means for outputting a delayed color signal as a second color signal by a time period which is an integer multiple of a horizontal scanning period of said composite image signal;
   logic means responsive to said first color signal and said second color signal for separately outputting the color signal component having vertical correlation and the luminance signal component not having vertical correlation with said first color signal;
   means for processing said first color signal and the outputs of said logic means to form a color signal output which is limited in either amplitude or bandwidth or both amplitude and bandwidth and to obtain an enhanced color carrier signal on the basis of said color signal component and said color signal output; and
   separating means for separating a luminance signal from said composite image signal by either adding said enhanced color carrier signal to said composite image signal or subtracting said enhanced color signal from said composite image signal.

2. The luminance signal/color signal separation circuit according to claim 1, wherein said logic means comprises:
   a first higher potential output circuit for outputting a higher potential of said first color signal and an inverted version of said second color signal;
   a first lower potential output circuit for outputting a lower potential of said first color signal and an inverted version of said second color signal;
   a second higher potential output circuit for outputting a higher potential of said first color signal and said second color signal;
   a second lower potential output circuit for outputting a lower potential of said first color signal and said second color signal;
   a third lower potential output circuit for outputting a lower potential of an output from said first higher potential circuit and a reference signal;
   a third higher potential output circuit for outputting a higher potential of an output from said first lower potential circuit an said reference signal;
   a fourth lower potential output circuit for outputting a lower potential of an output from said second higher potential circuit and said reference signal;

a fourth higher potential output circuit for outputting a higher potential of an output from said first lower potential circuit and said reference signal;

first coupling means for outputting a wide band color comb signal corresponding to said color signal component having vertical correlation by coupling an output of said third lower potential output circuit and an output of said third higher potential output circuit;

second coupling means for outputting said luminance signal component not having vertical correlation by coupling an output of said fourth lower potential output circuit and an output of said fourth higher potential output circuit;

wherein said means for processing comprises:

third coupling means for coupling an output of said first coupling means and an output of said second coupling means;

fourth coupling means for coupling an output of said third coupling means and said first color signal;

attenuating means for decreasing a level of an output of said fourth coupling means; and fifth coupling means for outputting said enhanced color carrier signal by coupling said output of said first coupling means and an output of said attenuating means.

3. The luminance signal/color signal separation circuit according to claim 1, wherein said logic means comprises:

a first higher potential output circuit for outputting a higher potential of said first color signal and an inverted version of said second color signal;

a first lower potential output circuit for outputting a lower potential of said first color signal and an inverted version of said second color signal;

a second higher potential output circuit for outputting a higher potential of said first color signal and said second color signal;

a second lower potential output circuit for outputting a lower potential of said first signal and said second color signal;

a third lower potential output circuit for outputting a lower potential of an output from said higher potential circuit and a reference signal;

a third higher potential output circuit for outputting a higher potential of an output from said first lower potential circuit and said reference signal;

a fourth lower potential output circuit for outputting a lower potential of an output from said second higher potential circuit and said reference signal;

a fourth higher potential output circuit for outputting a higher potential of an output from said first lower potential circuit and said reference signal;

first coupling means for outputting a wide band color comb signal corresponding to the color signal component having vertical correlation by coupling an output of said third lower potential output circuit and an output of said third higher potential output circuit;

second coupling means for outputting said luminance signal component not having vertical correlation by coupling an output of said fourth lower potential output circuit and an output of said fourth higher potential output circuit;

wherein said means for processing comprises:

third coupling means for coupling an output of said first coupling means and an output of said second coupling means;

fourth coupling means for coupling an output of said third coupling means and said first color signal;

narrow range bandpass filtering means for giving a narrow range frequency characteristic to the output of said fourth coupling means; and fifth coupling means for outputting said enhanced color carrier signal by coupling said output of said first coupling means and an output of said narrow range bandpass filtering means.

4. The luminance signal/color signal separation circuit according to claim 1, wherein said logic means comprises:

a first higher potential output circuit for outputting a high potential of said first color signal and an inverted version of said second color signal;

a first lower potential output circuit for outputting a lower potential of said first color signal and an inverted version of said second color signal;

a second higher potential output circuit for outputting a higher potential of said first color signal and said second color signal;

a second lower potential output circuit for outputting a lower potential of said first color signal and said second color signal;

a third lower potential output circuit for outputting a lower potential of an output from said first higher potential circuit and a reference signal;

a third higher potential output circuit for outputting a higher potential of an output from said first lower potential circuit and said reference signal;

a fourth lower potential output circuit for outputting a lower potential of an output from said second higher potential circuit and said reference signal;

a fourth higher potential output circuit for outputting a higher potential of an output from said first lower potential circuit and said reference signal;

first coupling means for outputting a wide band color comb signal corresponding to said color signal component having vertical correlation by coupling an output of said third lower potential output circuit and an output of said third higher potential output circuit;

second coupling means for outputting said luminance signal component not having vertical correlation by coupling an output of said fourth lower potential output circuit and an output of said fourth higher potential output circuit;

wherein said means for processing comprises:

third coupling means for coupling an output of said first coupling means and an output of said second coupling means;

fourth coupling means for coupling an output of said third coupling means and said first color signal;

blocking means for blocking an output of said fourth coupling means when the amplitude of the output of the fourth coupling means decreases below a present level; and fifth coupling means for outputting said enhanced color carrier signal by coupling said output of said first coupling means and an output of said blocking means.

5. The luminance signal/color signal separation circuit according to claim 4, wherein said blocking means comprises two diodes connected in parallel with their polarities reversed.

6. The luminance signal/color signal separation circuit of claim 1, wherein said means for processing generates a band limited signal component and an amplitude limited signal component and comprises:

first processing means for processing a combination of the negative of the sum of said color signal component and said luminance signal component and the negative of said first color signal and generating said band limited signal component;

second processing means for processing said band limited signal component for limiting the amplitude of said band limited signal component and generating said amplitude limited signal component which corresponds to said color signal output;

means for adding together said color signal output and said color signal component to generate said enhanced color carrier signal.

7. A luminance signal/color signal separation circuit comprising:

bandpass filtering means for separation of a first color signal from a composite image signal;

delay means for outputting a delayed color signal as a second color signal by a time period with is an integer multiple of a horizontal scanning period of said composite image signal;

logic means for outputting a color signal component with a wide range for pictures having vertical correlation and at a reduced level for pictures having no vertical correlation, wherein said logic means comprises:

a first higher potential output circuit for outputting a higher potential of said first color signal and an inverted version of said second color signal;

a first lower potential output circuit for outputting a lower potential of said first color signal and an inverted version of said second color signal;

a second higher potential output circuit for outputting a higher potential of said first color signal and said second color signal;

a second lower potential output circuit for outputting a lower potential of said first color signal and said second color signal;

a third lower potential output circuit for outputting a lower potential of an output from said first higher potential circuit and a reference signal;

a third higher potential output circuit for outputting a higher potential of an output from said first lower potential circuit and the reference signal;

a fourth lower potential output circuit for outputting a lower potential of an output from said second higher potential circuit and the reference signal;

a fourth higher potential output circuit for outputting a higher potential of an output from said first lower potential circuit and the reference signal;

first coupling means for outputting a wide band color comb signal by coupling an output of said third lower potential output circuit and an output of said third higher potential output circuit;

second coupling means for outputting a luminance signal by coupling an output of said fourth lower potential output circuit and an output of said fourth higher potential output circuit;

third coupling means for coupling an output of said first coupling means and an output of said second coupling means;

fourth coupling means for coupling an output of said third coupling means and said output of said bandpass filtering means;

narrow range bandpass filtering means for giving a narrow range frequency characteristic to the output of said fourth coupling means; and fifth coupling means for separating said color signal component by coupling said output of said first coupling means and an output of said narrow range bandpass filtering means; and separating means for separating a luminance signal by either adding said color signal component to said composite image signal or subtracting said color signal component from said composite image signal.

* * * * *